(12) United States Patent
Herzog et al.

(10) Patent No.: US 11,914,839 B2
(45) Date of Patent: *Feb. 27, 2024

(54) CONTROLLING AUTOMATIC PLAYBACK OF MEDIA CONTENT

(71) Applicant: Spotify AB, Stockholm (SE)

(72) Inventors: Daniel Herzog, Stockholm (SE); Glenn James Gentzke, Astoria, NY (US); Jeffrey Paul Baxter, Knoxville, TN (US); Kylan McBride, Brooklyn, NY (US); Mark Kizelshteyn, Brooklyn, NY (US); Thomas Gayno, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,589

(22) Filed: Jul. 13, 2021

(65) Prior Publication Data

US 2022/0075505 A1 Mar. 10, 2022

Related U.S. Application Data

(63) Continuation of application No. 16/224,368, filed on Dec. 18, 2018, now Pat. No. 11,093,105.

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 3/0484* (2013.01); *G06F 3/165* (2013.01); *G06F 16/44* (2019.01); *H04L 65/60* (2013.01)

(58) Field of Classification Search
None
See application file for complete search history.

(56) References Cited

U.S. PATENT DOCUMENTS

| RE46,114 E | 8/2016 | Yellin et al. |
| 11,093,105 B2 | 8/2021 | Herzog |

(Continued)

FOREIGN PATENT DOCUMENTS

WO 2007/105180 9/2007

OTHER PUBLICATIONS

Guinness, Harry, "How to Stop Spotify from Auto-Playing Music after you Finish a Playlist or Album", How-To Geek, Oct. 26, 2017, Available Online at: https://www.howtogeek.com/330757/how-to-stop-spotify-from-auto-playing-music-after-you-finish-a-playlist-or-album/, 6 pages.

(Continued)

*Primary Examiner* — Xuyang Xia
(74) *Attorney, Agent, or Firm* — Merchant & Gould P.C.

(57) ABSTRACT

Systems and methods are provided for controlling playback of media content items on a media playback device. A graphical user interface displays media playback controls including an automatic playback switch. The switch is configured to enable or disable automatic playback of an autoplay queue of media content items. An initial queue of media content is selected for playback on the media playback device. When automatic playback is enabled, the system automatically generates a queue of media that is related to the initial queue and initiates playback on the media playback device after the initial queue concludes. Automatic playback options can also include repeating the initial queue or a single track within the initial queue.

20 Claims, 14 Drawing Sheets

(51) Int. Cl.
*H04L 65/60* (2022.01)
*G06F 16/44* (2019.01)
*G06F 3/0484* (2022.01)
*G06F 3/16* (2006.01)

(56) References Cited

U.S. PATENT DOCUMENTS

| | | | |
|---|---|---|---|
| 2004/0068605 | A1 | 4/2004 | Hirasawa |
| 2006/0010167 | A1* | 1/2006 | Grace ................ H04L 67/1095 |
| 2010/0306657 | A1* | 12/2010 | Derbyshire ............ G06F 16/64 715/862 |
| 2011/0039508 | A1* | 2/2011 | Lindahl ................ H04H 40/18 713/320 |
| 2012/0082439 | A1 | 4/2012 | Ashbrook et al. |
| 2013/0031477 | A1 | 1/2013 | Bilinski |
| 2014/0229894 | A1 | 8/2014 | Vinna |
| 2014/0282004 | A1 | 9/2014 | Birmingham |
| 2014/0331133 | A1* | 11/2014 | Coburn, IV ..... H04N 21/41265 715/716 |
| 2015/0193192 | A1* | 7/2015 | Kidron ................ G06F 3/165 700/94 |
| 2015/0222977 | A1* | 8/2015 | Angel, Jr. ............ H04R 1/1083 381/74 |
| 2016/0172000 | A1* | 6/2016 | Ju ........................ H04N 9/8042 386/241 |
| 2016/0266867 | A1* | 9/2016 | Olesh ................ G06F 3/04847 |
| 2016/0291817 | A1* | 10/2016 | Sanders ................ G06F 3/0482 |
| 2016/0371053 | A1 | 12/2016 | Jellison, Jr. et al. |
| 2017/0180772 | A1 | 6/2017 | Wilms et al. |

OTHER PUBLICATIONS

Jocke-Strid, "I actually WANT autoplay", The Spotify Community, May 13, 2017, Available Online at: https://commmunity.spotify.com/t5/iOS-iPhone-iPad/I-actually-WANT-autoplay/td-p/1676712, 9 pages.

"Autoplay videos," YouTube. Accessed Feb. 1, 2018. Available at: https://support.google.com/youtube/answer/6327615?co=GENIE.Platform%3DAnd- roid&hl=en, 1 page.

YouTube, Lemniscate—Walk (Live Pantera Cover), obtained online on Jul. 9, 2018 at: https://www.youtube.com/watch?v=pwVLqPkvgsw, 2 pages.

* cited by examiner

CONTROLLING AUTOMATIC PLAYBACK OF MEDIA CONTENT

CROSS-REFERENCE TO RELATED APPLICATION(S)

This application is a continuation of U.S. application Ser. No. 16/224,368, filed Dec. 18, 2018, the disclosure of which is hereby incorporated by reference in its entirety. To the extent appropriate, a claim of priority is made to the above-disclosed application

BACKGROUND

Music streaming services have made it easy and convenient for users to access a plethora of different types of media content easily. The media content can include music, podcasts, news programs, videos, TV shows, audio books and the like. Many services provide access to a large media library of content without requiring the purchase of individual media files or downloading any of those files. Users can stream media content to almost any device that can connect to the internet and output audio and/or video.

Access to such a large library of media content can be overwhelming. It can be difficult for users to select the music they want to listen to and, as a result, many media streaming providers have made it easier for users to select playlists or queues of media content. Various algorithms have been implemented to provide recommendations of media content to users.

SUMMARY

In general terms, the present disclosure relates to providing controls for automatic media playback settings. In one possible configuration and by non-limiting example, a media playback device is configured to automatically generate queues of media content based on a media context category that the media playback device was playing. Various aspects are described in this disclosure, which include, but are not limited to, the following aspects.

One aspect is a computer-implemented method for controlling playback of media content items on a media playback device. The method begins by displaying a graphical user interface on the media playback device that includes multiple graphical control elements usable to control playback of media content items on the media playback device. The graphical control elements include an automatic playback switch configured to enable and disable automatic playback of an autoplay queue of media content items. A selection of media content for playback on the media playback device is received. The media content includes an initial queue of media content items which is retrieved and played on the media playback device. It is then determined whether automatic playback is enabled or disabled. When automatic playback is enabled, upon concluding playback of the initial queue of media content items, automatically retrieving and initiating playback of an autoplay queue of media content items on the media playback device, the media content items of the autoplay queue being related to the media content items in the initial queue. When automatic playback is disabled, upon concluding playback of the initial queue of media content items, stopping playback.

Another aspect is a system for controlling playback of media content items on a media playback device. The system includes a media playback device. The media playback device includes a user input device, a media content output device, and a media playback application. The user input device is configured to receive selections of media playback options. The media content output device is configured to play streamed media content. The media playback application is configured to generate a graphical user interface including multiple graphical control elements usable to control playback of media content items on the media playback device. The graphical control elements include an automatic playback switch configured to enable and disable automatic playback of an autoplay queue of media content items. The media playback application is further configured to receive selections of the automatic playback switch, and display a current state of the automatic playback switch.

Yet another aspect is one or more computer-readable media having computer-executable instructions stored therein that, when executed by at least one computing device, causes the at least one computing device to perform a method. The method includes displaying a graphical user interface on a media playback device, the graphical user interface including multiple graphical control elements that are usable to control playback of media content items. The graphical control elements include an automatic playback switch configured to enable or disable automatic playback of an autoplay queue of media content items. The method continues when the devices receive input at the automatic playback switch to enable automatic playback of an autoplay queue of media content items. The visual appearance of the automatic playback switch is changed to indicate that automatic playback is enabled. A selection of media content is received for playback on the media playback device, where the media content includes an initial queue of media content items. The initial queue of media content items is retrieved and played on the media playback device. It is determined that automatic playback of media content items is enabled. Upon concluding playback of the initial queue of media content items, the autoplay queue of media content items is automatically retrieved and played on the media playback device. The media content items of the autoplay queue are related to the media content items in the initial queue.

DETAILED DESCRIPTION

Figure 1:
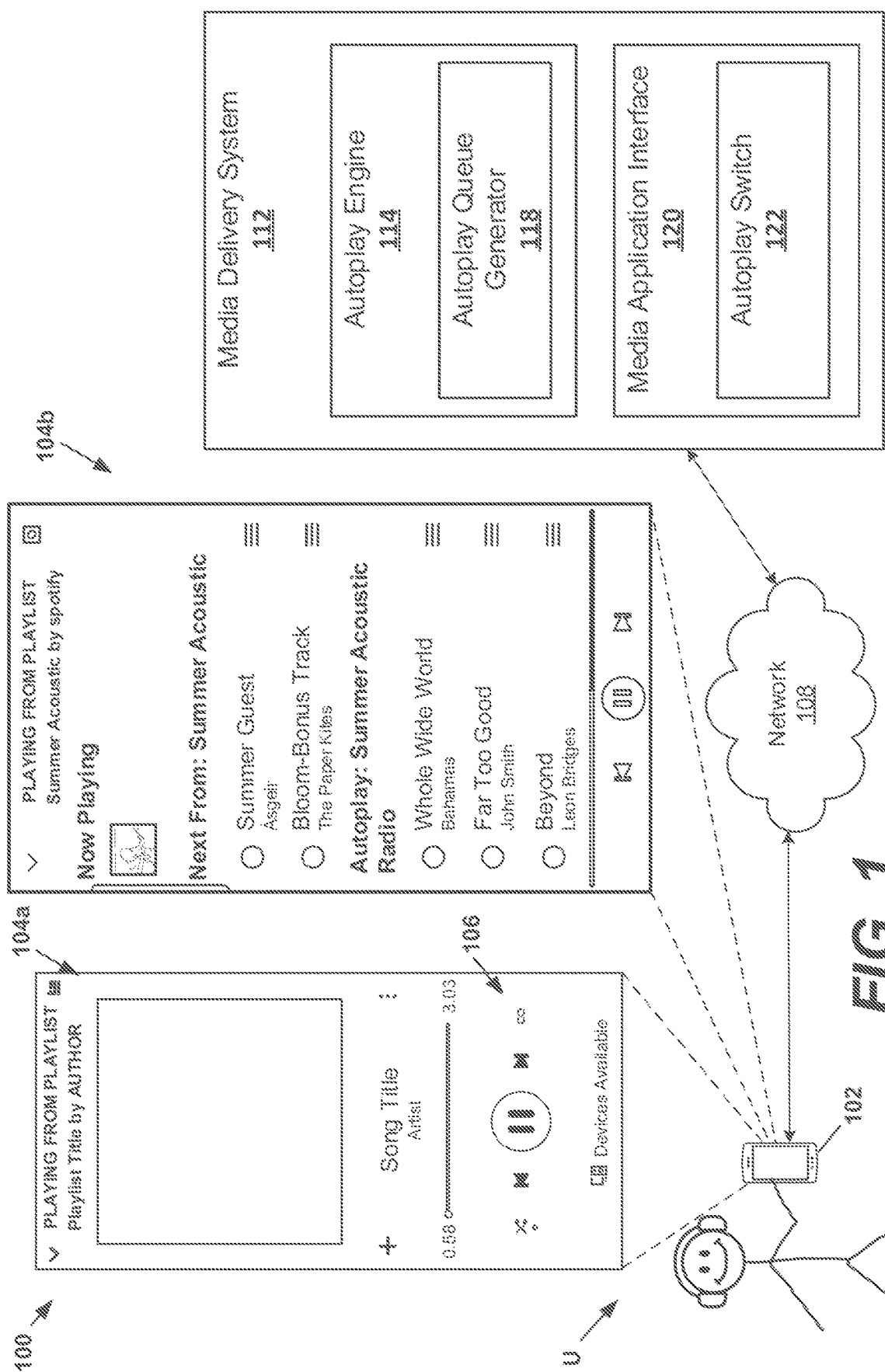
FIG. 1 illustrates an example system for controlling automatic playback of media content items on a media playback device.

Various embodiments will be described in detail with reference to the drawings, wherein like reference numerals represent like parts and assemblies throughout the several views.

As used herein, the term "media content" refers to audio content, video content, and combinations thereof. Examples of audio content include songs, albums, playlists, radio stations, podcasts, audiobooks, and other audible media content items. Examples of video content include movies, music videos, television programs, and other visible media content items. In many cases, video content also includes audio content.

The term "queue" refers to a playlist or upcoming lineup of media content items that will be played on a media playback device. A queue can be a list of finite length. Alternatively, a queue can be continually updated to generate new media content items for the list as the queue is played.

The term "track" refers to a single media content item such as a song.

The term "radio" as used herein refers to a queue of media content that is generated by a media content streaming service. The queue is generated based on a seed song, artist, album, playlist, or genre. Media content items are selected for the "radio station" based on similarities of attributes of the seed.

The term "media context" refers to the category of media queue. There are multiple varieties of queues of media content. For example, categories of media queues can include playlists, albums, artists, genres, and songs. The media context refers to the type of relationship that exists between one or more media content items.

An automatic media playback service or "autoplay" service generates media content that is similar to what a user has just consumed without additional input from the user.

While using a media streaming service, a user selects a particular media context to listen to, such as an album by a particular artist, and that album plays through the music streaming service. Once a user has selected a particular media content to listen to and has listened to a playlist or album of music, the user may not wish to take the time to select different media content once the first playlist or queue has concluded. For example, if a user has selected a playlist entitled "Beach Party" to play while at a beach party, the user is unlikely to wish to have to select additional music to play once that playlist has ended. The user is enjoying the party and does not want to spend time finding another appropriate playlist. However, due to the large selection of music available, users don't necessarily wish to repeat the same content that they have just listened to. Users typically wish to continue to listen to similar music or similar media content after an initial queue has been played.

The autoplay service will choose media content that is similar to what the user was just listening to. In this example, the user might have been listening to a particular album by a particular artist. The auto-play system might then automatically start playback of a different album by the same artist. There are numerous methods by which the autoplay system could generate additional media content.

In one example, the new autoplay queue is generated using radio algorithms. 40 dimensional methods and user vectors are utilized to select media content items that are related to a seed. The seed can be a song, an artist, an album, a playlist, or a genre. The radio queue could be steered using thumbs up or thumbs down to influence future songs that are selected. The queue of radio songs could also be personalized to the particular user's vector.

In another method of generating automatic playback, a playlist can be selected that is similar to the context that the user was just listening to. The playlist could be selected based on an overlap of artists and/or songs with the original music context. In the example of the user listening to a particular album by a particular artist, auto-play could then select a curated music playlist that includes songs from that artist and album. In other examples, the playlist could be selected based on a similar genre and other musical attributes. In some instances, the playlists are selected for co-occurrence and include songs that the user is likely to enjoy based on past listening history.

A variety of factors can be considered in selecting the media for the autoplay queue. For example the acoustic elements of the most recently played songs that were selected by the user could be used to match to the new autoplay media content. External attributes and user attributes could also be utilized. Playlist co-occurrence or playlist extender could be utilized. The autoplay queue of media content items is selected based on at least one attribute associated with the initial queue of media content items. Example attributes include one or more acoustic elements of media content items in the first queue; a user preference; a geographic location; a time of day; and an external attribute.

In some instances, the autoplay feature might query the user to determine if the user has a preference between two or more queues of media content to begin playback after the initially selected queue has concluded. For example, the autoplay system might present two different curated playlists for the user to choose from. After a predetermined amount of time, such as ten seconds, the system could automatically select a default playlist for the user.

A user can access settings associated with the user's account to select whether or not the autoplay service is enabled. First, the user can select to enable autoplay or disable auto-play. If autoplay is disabled, no automatic queues of media content will be generated if selected media content queues conclude. If autoplay is enabled, the previous described automatic queues of related media content will be generated.

The user can enable or disable the autoplay feature by selecting a settings icon on a user interface and then selecting to turn on or off autoplay with a selector such as a toggle. In some instances, the autoplay feature could be turned on or off without accessing a settings interface.

Autoplay can be controlled on a media playback device using a graphical user interface (GUI) configured to display media playback controls including an autoplay switch. This allows the user to more easily change autoplay settings without accessing a separate settings menu screen. In some embodiments, the autoplay switch is configured to switch between two settings: automatic playback on, and automatic playback off. In this embodiment, the media content that is automatically played is automatically selected as well. In other embodiments, the autoplay switch is configured to switch between four settings: automatic playback off, repeat track on, repeat playlist on, and automatic playback on. In this embodiment, automatic playback refers to an autoplay queue that is automatically generated and played back after an initial queue of media content items has concluded. The repeating options cause the media content item (track) or media content items (playlists) to repeat after they conclude. No new media content is generated for playback.

FIG. 1 illustrates an overview of example system 100 for configuring automatic playback settings on a media playback device. A user U is operating a media playback device 102. The media playback device 102 includes a graphical user interface 104 (GUI) shown on a display. The media playback device 102 communicates with a network 108 that is also in communication with a media delivery system 112. The media delivery system 112 includes an autoplay engine 114 and a media application interface 120. The media delivery system 112 operates to provide media content for playback on the media playback device 102. In some examples, the media content is provided by streaming through the network 108. In other examples, media content is communicated through the network 108 to the media playback device 102, where it is saved or cached for later playback.

The autoplay engine 114 operates to control the functionality of automatic playback features of a media streaming service provided by the media delivery system 112. The autoplay engine 114 is operable to control whether additional media content items will be played automatically after an initial queue of selected media content items concludes playback. The autoplay engine 114 includes an autoplay queue generator 118. The autoplay queue generator 118 operates to generate a queue of media content that is provided to the media playback device 102 after an initially selected queue of media content has ceased playing. The autoplay queue generator 118 selects a new queue of media content based on various factors of the initial queue of media content. An example of the new media content queue is displayed in 104b, following the conclusion of the initial playlist "Summer Acoustic."

The media application interface 120 operates to present a graphical user interface for display on a media playback device, such as the GUI 104 displayed on the media playback device 102 shown in FIG. 1. The GUI 104 provides controls that can be selected by the user U to adjust settings and control playback of media content. The media application interface 120 includes an autoplay switch 122. The autoplay switch 122 is a graphical element that is displayed on a GUI such as the GUI 104 and is operable to receive input to change an autoplay setting. In particular, the autoplay switch 122 is operable to enable or disable automatic playback of media content items.

Figure 2:
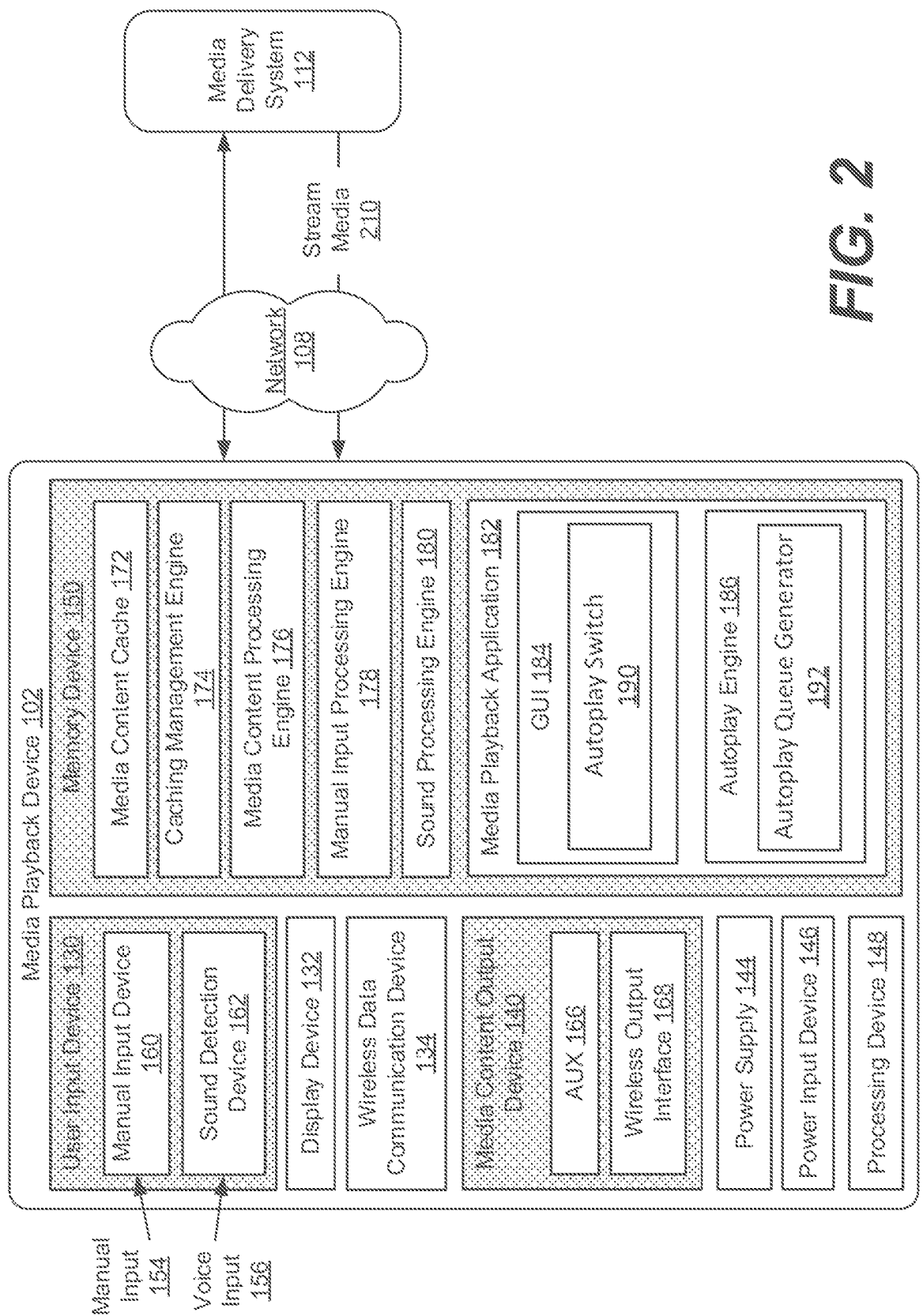
FIG. 2 is a block diagram of an example embodiment of the media playback device of FIG. 1.

FIG. 2 illustrates a detailed block diagram of the media playback device 102 of the system 100 shown in FIG. 1. The media playback device 102 is in communication with the media delivery system 112 through a network 108. Stream media 210 is provided by the media delivery system 112 to the media playback device 102 through the network 108.

The network 108 is a data communication network through which the media playback device 102 and the media delivery system 112 can communicate. The network 108 typically includes a set of computing devices and communication links between the computing devices. The computing devices in the network 108 use the links to enable communication among the computing devices in the network. The network 108 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 108 includes various types of communication links. For example, the network 108 can include wired and/or wireless links, including cellular, Bluetooth, ultra-wideband (UWB), 802.11, ZigBee, and other types of wireless links. Furthermore, in various embodiments, the network is implemented at various scales. For example, the network 108 can be implemented as one or more vehicle area networks, local area networks (LANs), metropolitan area networks, subnets, wide area networks (WAN) (such as the Internet), or can be implemented at another scale. Further, in some embodiments, the network 108 includes multiple networks, which may be of the same type or of multiple different types.

In the example of FIG. 2, the media playback device includes a user input device 130, a display device 132, a wireless data communication device 134, a media content output device 140, a power supply 144, a power input device 146, a processing device 148, and a memory device 150.

The user input device 130 operates to receive a user input for controlling the media playback device 102. As illustrated, the user input can include a manual input 154 and/or a voice input 156. In some embodiments, the user input device 130 includes a manual input device 160 and a sound detection device 162.

The manual input device 160 operates to receive the manual input 154 for controlling playback of media content via the media playback device 102. In addition, in some embodiments, the manual input 154 is received for managing and/or controlling other functions or aspects associated with the media playback device 102.

In some embodiments, the manual input device 160 includes one or more manual control elements configured to receive various manual control actions, such as pressing actions and rotational actions. Such control elements could be buttons or knobs. In other embodiments, the manual input device 160 includes a touch screen that accepts gestures made with a user's fingers or a stylus. The inputs on the touch screen can be received via graphical control elements displayed on a GUI.

The sound detection device 162 operates to detect and record sounds from proximate to the media playback device 102. For example, the sound detection device 162 can detect sounds including the voice input 156. In some embodiments, the sound detection device 162 includes one or more acoustic sensors configured to detect sounds proximate to the media playback device 102. For example, acoustic sensors of the sound detection device 162 includes one or more microphones. Various types of microphones can be used for the sound detection device 162 of the media playback device 102.

In some embodiments, the voice input 156 is a user's voice for controlling playback of media content via the media playback device 102. In addition, the voice input 156 manages various data transmitted via the media playback device 102 and/or controlling other functions or aspects associated with the media playback device 102.

In some embodiments, the sounds detected by the sound detection device 162 can be processed by the sound processing engine 180 of the media playback device 102 as described below.

Referring still to FIG. 2, the display device 132 operates to display information to the user. Examples of such information include media content playback information, notifications, and other information. The display device 132 also operates to display graphical user interfaces (GUIs) to facilitate user interaction with the media playback device 102. One such GUI is the GUI 184 for the media playback application 182.

In some embodiments, the display device 132 is configured as a touch-sensitive display screen that operates as both a display screen and a user input device. The GUI 184 can receive touch input that is used to select graphical control elements such as the autoplay switch 122. In other embodiments, the display device 132 may not operate as a user input device and input is received through physical controls on the media playback device 102.

The wireless data communication device 134 operates to enable the media playback device 102 to communicate with one or more computing devices at a remote location. For example, the wireless data communication device 134 is configured to communicate with the media delivery system 112 and receive media content from the media delivery system 112 at least partially via the network 108. The wireless data communication device 134 can be a wireless network interface of various types which connects the media playback device 102 to the network 108. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the media playback device 102 and the media delivery system 112 over cellular network.

The media content output device 140 is an interface that enables the media playback device 102 to play media content. In some embodiments, the media content output device 140 is speakers that are built into the media playback device 102. In some embodiments, the media content output device 140 includes an auxiliary (AUX) output interface 166 and a wireless output interface 168.

The AUX output interface 166 is configured to connect the media playback device 102 to an external audio output device such as a speaker. This connection can be made through a cable extending from the media playback device 102 to an input jack or port on the external audio output device. The cable can be of various types, such as an analog audio cable or a USB cable.

The wireless output interface 168 is configured to connect the media playback device 102 to an external audio output device via a wireless communication protocol. In some embodiments, the wireless output interface 168 is configured for Bluetooth connection. In other embodiments, the wireless output interface 168 is configured for other types of wireless connection.

The power supply 144 is included in the example media playback device 102 and is configured to supply electric power to the media playback device 102. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the media playback device 102 and is not removable from the media playback device 102. In other embodiments, the power supply 144 is removable from the media playback device 102.

The power input device 146 is configured to receive electric power to maintain activation of components of the media playback device 102.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, and a media playback application 182.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In other embodiments, the caching management engine 174 operates to cache at least a portion of media content into the media content cache 172 while online so that the cached media content is retrieved for playback while the media playback device 102 is offline.

The media content processing engine 176 is configured to process the media content that is received from the media delivery system 112, and generate playback through the media content output device 140.

The manual input processing engine 178 operates to receive the manual input 154 via the manual input device 160. In some embodiments, when the manual input device 160 is actuated (e.g., swiped or tapped) upon receiving the manual input 154, the manual input device 160 generates an electric signal representative of the manual input 154. The manual input processing engine 178 can process the electric signal and determine the input (e.g., command or instruction) corresponding to the manual input 154 to the media playback device 102. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter voice input 156 from noises included in the detected sounds. Various noise cancellation technologies, such as active noise control or cancelling technologies or passive noise control or cancelling technologies, can be used for filter the voice input from ambient noise.

In some embodiments, a recording of sounds captured using the sound detection device 162 can be analyzed using speech recognition technology to identify words spoken. The words may be recognized as commands that alter the playback of media content and/or other functions or aspect of the media playback device 102. In some embodiments, the words and/or the recordings may also be analyzed using natural language processing and/or intent recognition technology to determine appropriate actions to take based on the spoken words.

The media playback application 182 includes a GUI 184 and an autoplay engine 186. The GUI 184 includes an autoplay switch 190. The autoplay engine 186 includes an autoplay queue generator 192. The media playback application 182 operates to present a graphical user interface 184 on the media playback device 102 via a display device 132. The media playback application 182 also generates media content to be played through the media content output device 140. In some instances, the media playback application 182 receives media content through the wireless data communication device 134.

The GUI 184 generates an interface through which a user can select media content to play, adjust settings for playback, and update user profile information. An example of the GUI 184 is the GUI 104 shown on the media playback device 102 in FIG. 1. The GUI 184 generates various graphical control elements for controlling playback of media content. In particular, an autoplay switch 190 is displayed on the GUI 184. The autoplay switch 190 can be actuated with user input such as a touch or click. The autoplay switch 190 operates to show the current status of automatic playback settings as well as receive input to change the current settings of automatic playback on a media playback device.

The autoplay engine 186 operates to control the automatic generation of media content queues to be automatically played after an initial queue of media content selected by the user has concluded. In some embodiments, the autoplay engine 186 controls settings for automatic playback of media content. The settings can be saved in an autoplay settings data store that is associated with a particular user's account. The autoplay engine 186 includes an autoplay queue generator 192.

The autoplay queue generator 192 operates to generate an autoplay queue of media content items and communicates that queue to the media stream service. The autoplay queue generator 192 determines an appropriate type of content for the autoplay queue and then selects media content items that are related to the currently playing initial queue of media content items.

Figure 3:
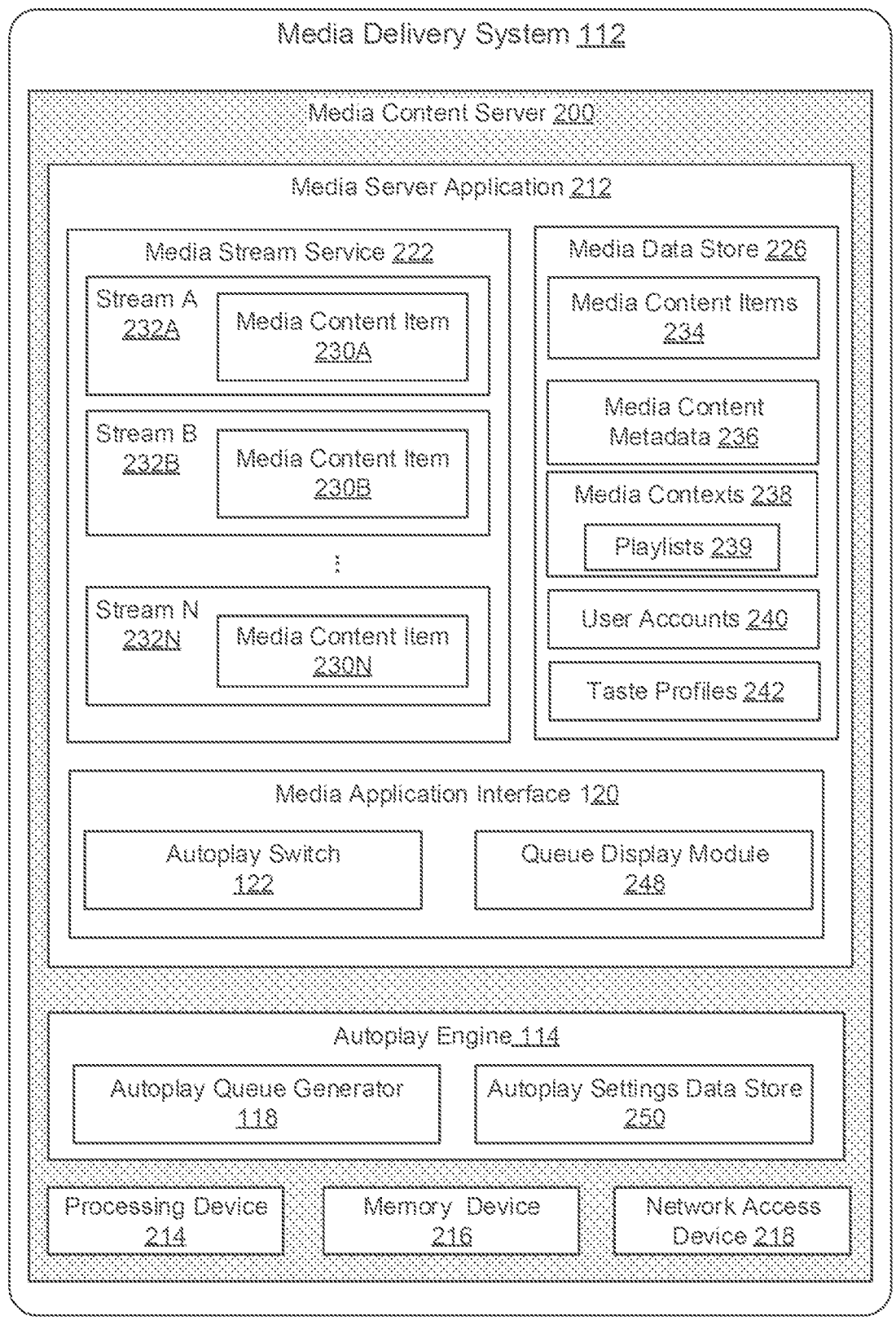
FIG. 3 is a block diagram of an example embodiment of the media delivery system of FIG. 1.

FIG. 3 is a block diagram of an example embodiment of the media delivery system 112 of FIG. 1. The media delivery system 112 includes a media content server 200.

The media delivery system 112 comprises one or more computing devices and provides media content to the media playback device 102 and, in some embodiments, other media playback devices, as well. In addition, the media delivery system 112 interacts with the media playback device 102 to provide the media playback device 102 with various functionalities.

Although FIG. 3 shows a single media content server 200, some embodiments include multiple media content servers. In these embodiments, each of the multiple media servers may be identical or similar to the media content server 200 as described herein, and may provide similar functionality with, for example, greater capacity and redundancy and/or services from multiple geographic locations. Alternatively, in these embodiments, some of the multiple media servers, may perform specialized functions to provide specialized services. Various combinations thereof are possible as well.

The media content server 200 transmits stream media 210 (FIG. 2) to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 108. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the media playback device 102, to retrieve media content items from the media content server 200. For example, in FIG. 2, the media application interface 224 receives communication from the media playback device 102, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

Explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.), for a large library of songs or tracks can be evaluated and provided by one or more third party service providers. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, media content items in a playlist 239 can be played by selecting the playlist 239 via a media playback device, such as the media playback device 102. The media playback device then operates to communicate with the media delivery system 112 so that the media delivery system 112 retrieves the media content items identified by the playlist 238 and transmits data for the media content items to the media playback device for playback.

In some embodiments, the playlist 239 includes a playlist title and a list of media content item identifications. The playlist title is a title of the playlist, which can be received through inputs on a media playback device 102. The list of media content item identifications includes one or more media content item identifications (IDs) that refer to respective media content items 234.

The user accounts 240 are used to identify users of a media streaming service provided by the media delivery system 112. In some embodiments, a user account 240 allows for authentication before providing access to the media delivery system 112. In some embodiments, input for login can be received at different devices to access data associated with the user account in the media delivery system 112. User authentication information, such as a username, an email account information, a password, and other credentials, can be used to access a user media streaming account 240.

The user accounts 240 include data for devices associated with each user account. The user accounts 240 data store keeps track of the devices that can access the media content server 200 using a particular user account. In some embodiments, the user accounts 240 data store records settings for autoplay.

The taste profiles 242 contain records indicating media content tastes of users. A taste profile 242 can be associated with a user account and used to maintain an in-depth understanding of the music activity and preferences associated with a user account. Libraries and wrappers can be accessed to create taste profiles from a media library of the user account, social website activity and other specialized databases to mine music preferences.

In some embodiments, each taste profile 242 is a representation of media consumption activities. The media consumption activities can include a wide range of information such as artist plays, song plays, skips, dates of listen, songs per day, playlists, play counts, start/stop/skip data for portions of a song or album, contents of collections, rankings, preferences, or other mentions received via a client device, or other media plays, such as websites visited, book titles, movies watched, playing activity during a movie or other presentations, ratings, or terms corresponding to the media, such as "comedy", "sexy", etc. In addition, the taste profiles 242 can include other information. For example, the taste profiles 242 can include libraries and/or playlists of media content items associated with the user account.

The taste profiles 242 can be used for a number of purposes. One use of taste profiles is for creating personalized playlists (e.g., personal playlisting). An API call associated with personal playlisting can be used to return a playlist customized to a particular user account. For example, the media content items listed in the created playlist are constrained to the media content items in a taste profile associated with the particular user account.

Yet another use case is for personalized recommendation, where the contents of a taste profile are used to represent an individual's taste. This API call uses a taste profile as a seed for obtaining recommendations or playlists of similar artists.

A taste profile 242 can represent a single user account or multiple users' accounts. Conversely, a single user account can have multiple taste profiles 242. For example, one taste profile can be generated in connection with media content play activity of a user account, whereas another separate taste profile can be generated for the same user account based on the selection of media content items and/or artists for a playlist.

The autoplay engine 114 includes an autoplay queue generator 118, and an autoplay settings data store 250. Each of these components operates in the same way as those in FIG. 2.

Figure 4:
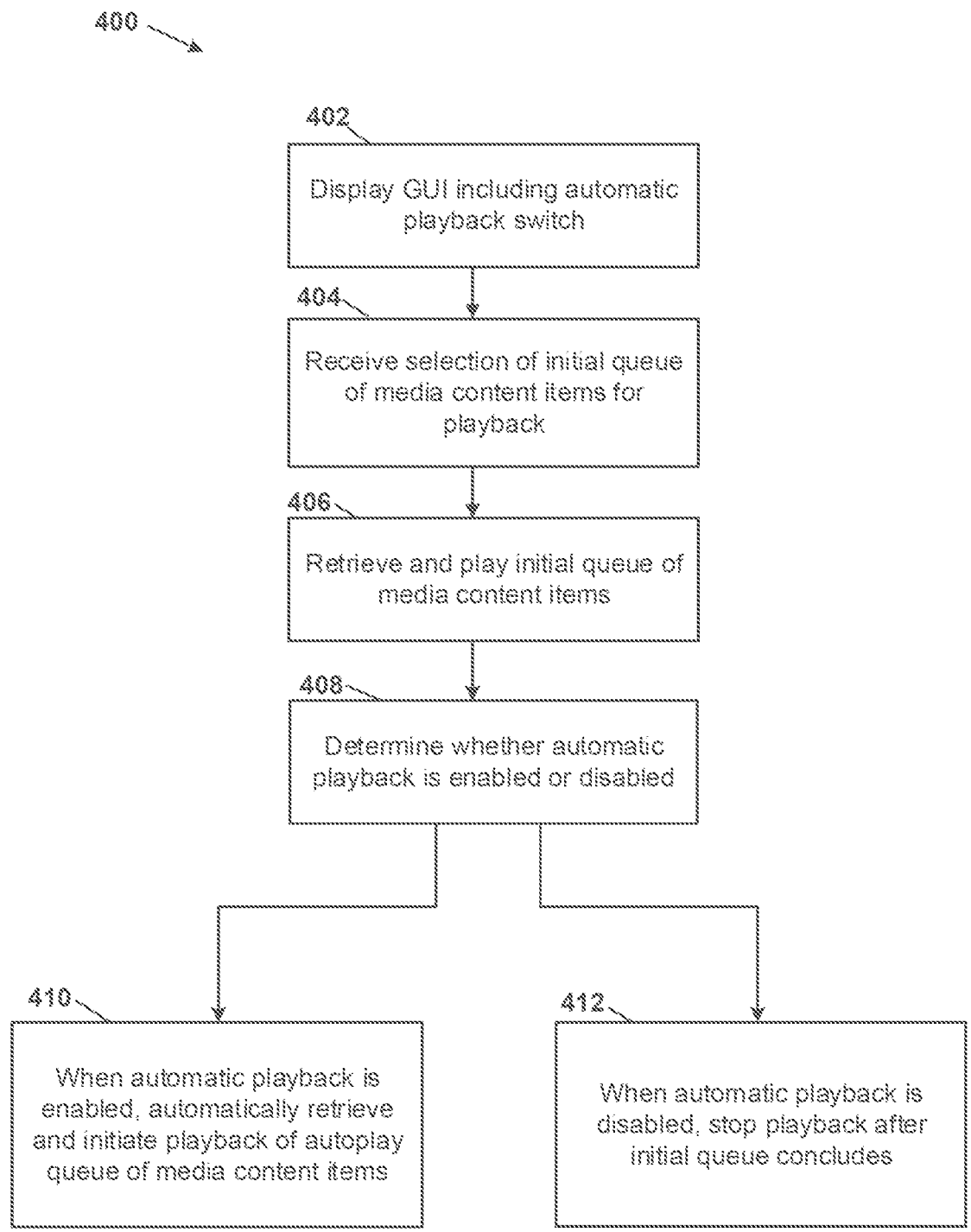
FIG. 4 is a flow diagram illustrating an example method of controlling playback of media content items on a media playback device.

FIG. 4 illustrates a flow diagram of an example method 400 of controlling playback of media content items on a media playback device.

Figure 5:
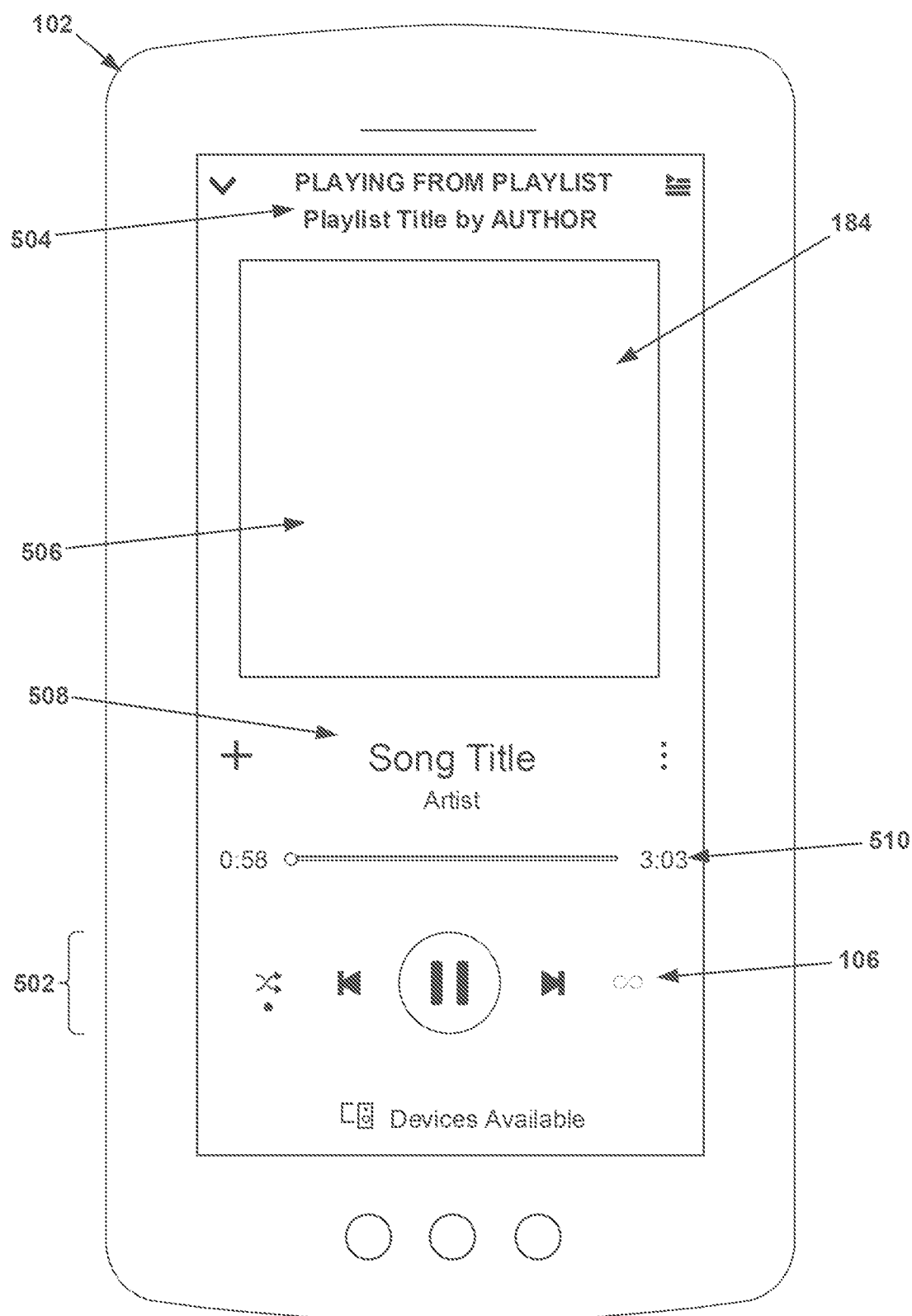
FIG. 5 is an example display of a graphical user interface presented on the media playback device of FIG. 1.

At operation 402, a graphical user interface is displayed on the media playback device. The GUI includes a playback switch. The playback switch is displayed as a selectable icon. In some embodiments, the selectable icon has a lemniscate shape. The GUI can also include other elements that can be selected or actuated by user to control playback of media content. For example, the GUI can include icons that can be selected to initiate playback of a media content queue, pause playback, skip to the next media content item, or select a different media content queue. An example GUI 184 is shown in FIG. 5.

At operation 404, an initial selection of a queue of media content items received for playback. The selection can be received through the GUI of FIG. 2. Inputs can be received through the user input device 130. The initial queue can be any grouping of media content items such as a playlist, an album, or other collection of media content items.

At operation 406, the initial queue of media content is retrieved and played. The first queue of media content includes at least one media content item such as a song. The media content items are retrieved from the media content server. The first queue of media content is played through the media playback device 102 using a media content output device 140.

At operation 408, it is determined whether automatic playback is enabled or disabled. The autoplay engine 114 operates to ascertain whether automatic playback is enabled. A user can actuate the playback switch 106, 122 to control whether autoplay playback is enabled. In some embodiments, automatic playback can also be controlled in a settings menu for a media streaming service. In some embodiments, autoplay is automatically enabled by default. In other embodiments, autoplay is automatically disabled by default. To change from the default setting, the user must select a control to disable or enable autoplay.

Operation 410 occurs when automatic playback is enabled. An autoplay queue of media content items is automatically retrieved. The second queue of related media content is determined by the autoplay queue generator 118 of FIG. 2 and/or FIG. 3. After the initial queue of media content items concludes playing, the autoplay queue is played. This provides a continuous, uninterrupted stream of media playback. Methods of determining the second or "autoplay" queue of media content are further described in FIGS. 11-12.

Media content items in the autoplay queue automatically play immediately after the last media content item in the initial queue has concluded playing. The user of the media playback device 102 does not have to take additional action to choose additional media content to play or to prompt the media playback device to continue playing more media content.

Operation 412 occurs when automatic playback is disabled. Playback of media content stops after the initial queue of media content items concludes playing.

FIG. 5 illustrates an example display of a GUI 184 presented on a media playback device 102 for controlling playback of media content provided through a media streaming service. The GUI 184 shows a view including information about currently playing media content and controls for controlling playback. An autoplay switch 106 is shown as a lemniscate symbol.

The GUI 184 includes playback controls 502 represented by graphical elements. Selection of these playback controls allows a user to navigate through a queue of media content items. The playback controls 502 shown in GUI 184 can be used to shuffle playback, skip backward, pause, play, or skip forward. Shown with the playback controls 502 is the autoplay switch 106.

The GUI 104a also includes playlist information 504, artwork 506, media content item information 508, and a playback progress bar 510. More or fewer types of information can be displayed on the GUI 104a during media content playback on the media playback device 102.

The playlist information 504 can include a title of a currently playing queue of media content items. The author of the playlist or queue can also be displayed.

The artwork 506 can be displayed to represent the currently playing playlist or media content item. For example, artwork associated with a particular album can be displayed when a media content item from that album is being played. In other examples, the artwork 506 could be associated with the entire playlist and the display will remain the same as long as the same playlist is playing on the media playback device 102.

The media content item information 508 can include a title of the media content item that is currently playing. For example, the title could be of a particular song. The media content item information 508 can also include the name of an artist. For example, the artist could be a musical artist that performs the song that is currently playing. In other examples, the title could be of an audiobook and the artist could be the author of the book.

The playback progress bar 510 provides a graphical indication of how long the currently playing media content item is in duration and how far into the media content item the playback has progressed.

The autoplay switch 106 allows a user to enable or disable automatic playback of media content after the currently playing queue of media content concludes. It is beneficial to include the autoplay switch 106 on the GUI 184 for controlling media playback because a user can easily control the autoplay feature without accessing a separate menu screen for changing autoplay options or settings.

The autoplay switch 106 in FIG. 5 is shown as being disabled or off. The appearance of the lemniscate symbol is de-emphasized to indicate that autoplay is not enabled. The autoplay switch 106 could be lightened if the background was white or a lighter color instead of black. In other examples, the autoplay switch 106 could be positioned at other locations of the display. The lemniscate switch could be replaced with other graphical controls or selectors to indicate whether the autoplay feature is enabled or disabled.

Figure 6:
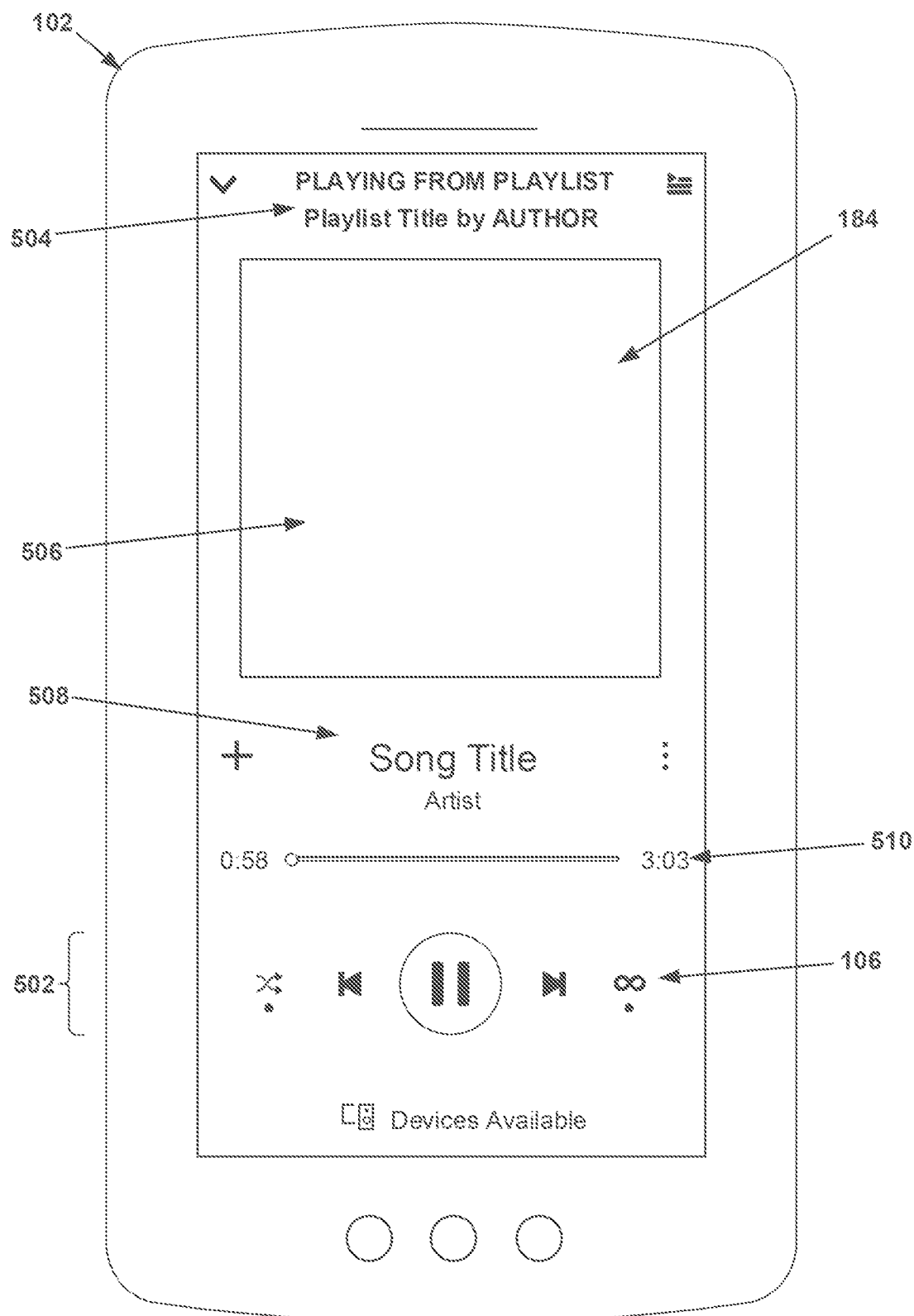
FIG. 6 illustrates another view of the graphical user interface of FIG. 5.

FIG. 6 shows the GUI 184 of FIG. 5 after the autoplay switch 106 has been selected to enable automatic playback. The appearance of the lemniscate symbol is emphasized to indicate that autoplay is enabled. The autoplay switch 106 could be visually emphasized by changing the color of the symbol, brightening the display of the symbol, or providing greater contrast between the symbol and the background of the GUI 184. In some embodiments, additional visual indicators are displayed to show that autoplay is enabled. For example, a dot could appear under the lemniscate icon to indicate that autoplay is enabled.

Figure 7:
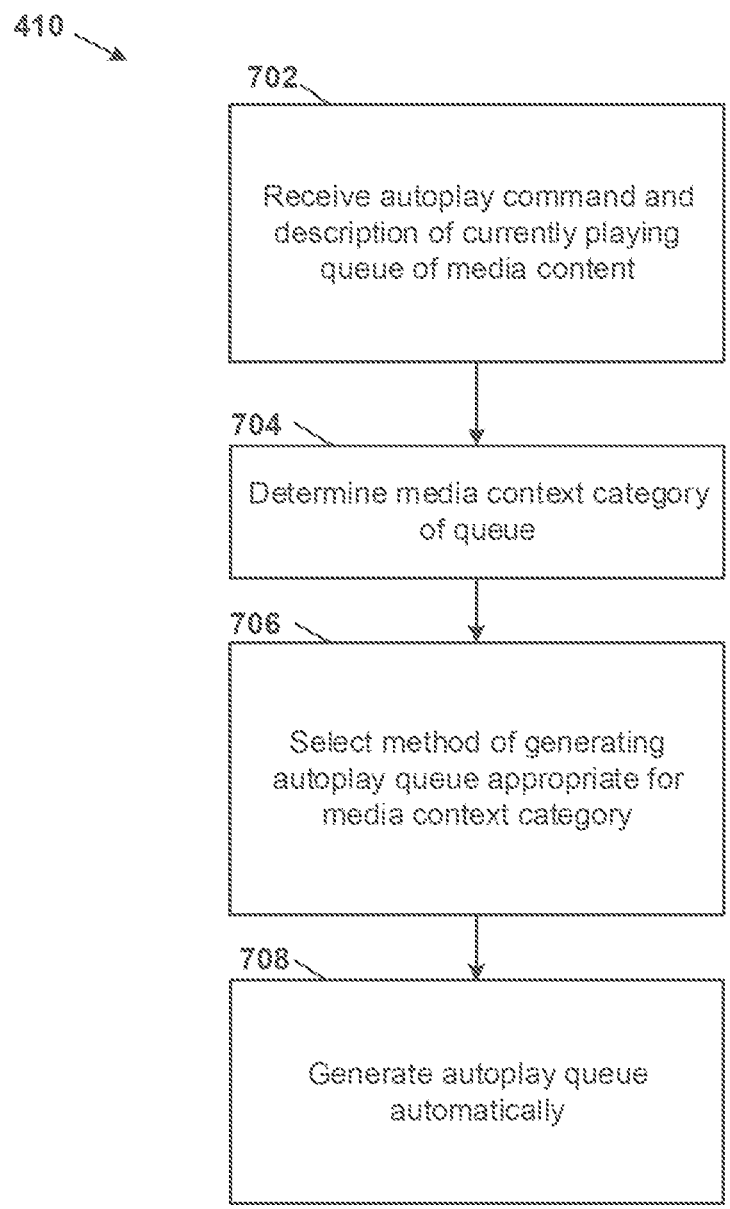
FIG. 7 is a flow diagram illustrating an example method of retrieving and initiating playback of an autoplay queue.

FIG. 7 is a flow diagram of an example method 410 of retrieving and initiating playback of an autoplay queue of media content items. The method 410 can be performed by the autoplay queue generator 118. The autoplay queue includes media content items that are related to the media content items being played in the initial queue.

At operation 702, an autoplay command is received along with a description of the currently playing queue of media content. Information regarding the initial queue of media content can be received from the media stream service 222. The autoplay command is received from the autoplay switch 122, 190 in some embodiments.

At operation 704, the media context category of the queue is determined. In some embodiments, this information is included with the autoplay command from the autoplay switch 190. The media context category is used to determine which type of autoplay queue to select. The chart in FIG. 8 lists some examples of media context categories.

At operation 706, a method of generating an autoplay queue is selected that is appropriate for the media context category of the initial queue. Multiple methods of determining media content items to include in an autoplay queue can be utilized. An example is illustrated and described in further detail with reference to FIG. 8.

Figure 8:
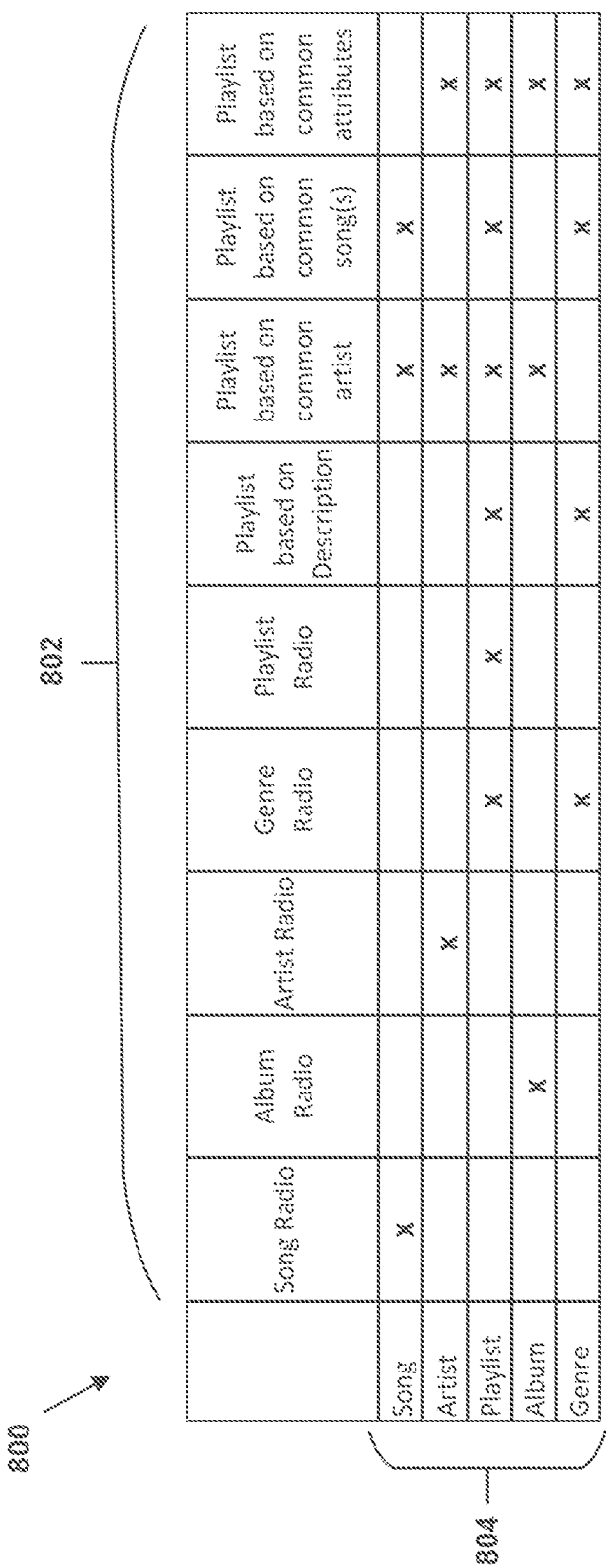
FIG. 8 is a table of example queue types that can be selected for an autoplay queue of related media content.

FIG. 8 displays a table 800 of example queue types that can be selected for a second queue of related media content. In this table, x's are placed for each category of media context 804 to indicate which types of autoplay queues 802 are appropriate.

Autoplay queues can be set up in a multitude of ways. Such means of generating a queue can include radio stations and playlists based on the media content that is currently playing. Radio stations can be generated based on a song, an artist, an album, or a genre. Radio stations can also be based on playlists. Radio stations can be personalized to a user vector meaning that the media content of the radio station is customized based on a particular user is listening history. Radio stations can also be generated based on matching acoustic elements of most recently played songs with those that are being generated in the autoplay queue. Radio stations continually update with new media content items indefinitely.

Playlists differ from radio stations in that they have a definite number of media content items. Playlists can be generated to include media content having a common artists or themes. Media content items for playlists can be selected based on acoustic elements of most recently played songs. In addition, user attributes can be utilized to aid in selection of media content items. In some instances, the playlist can be generated based on having a common description with a currently playing playlist. For example if a user is listening to a playlist entitled "Upbeat+Summer Sun," the autoplay queue may select the playlist entitled "Summer Beats" based on common descriptors of the playlist. In another example, the autoplay queue may utilize a playlist that a user is likely to enjoy based on having songs that are by the same artist or include songs that are in the currently playing queue. For example, if the user is listening to an initial queue of music that consists of a particular artist's album, the autoplay queue may consist of a playlist of multiple songs by the same artist.

Figure 9:
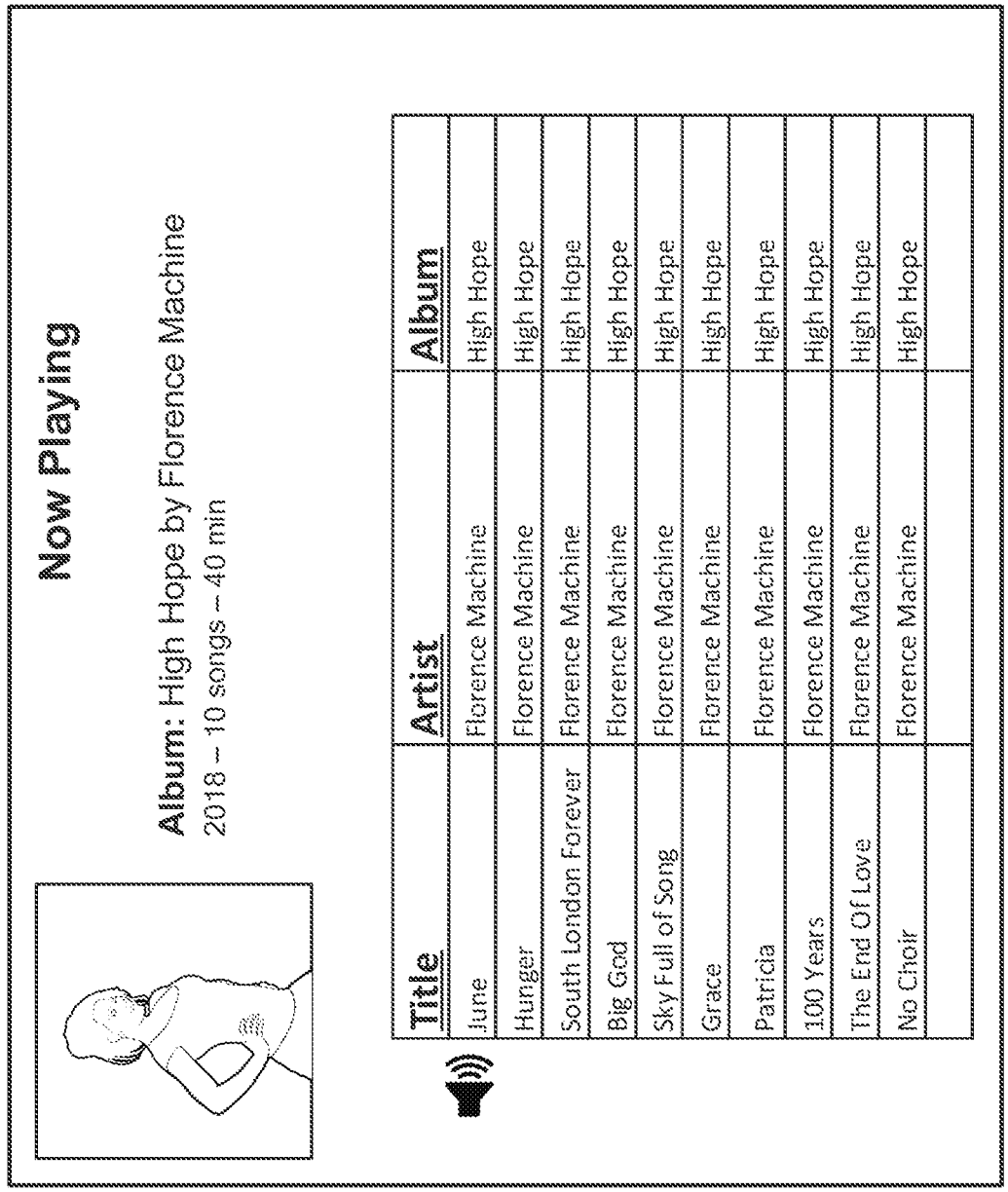
FIG. 9 illustrates an example display of an initial queue of media content items.

FIG. 9 illustrates an example display 900 of an initial queue 902 of media content items. The album "High Hope" is currently playing.

Figure 10:
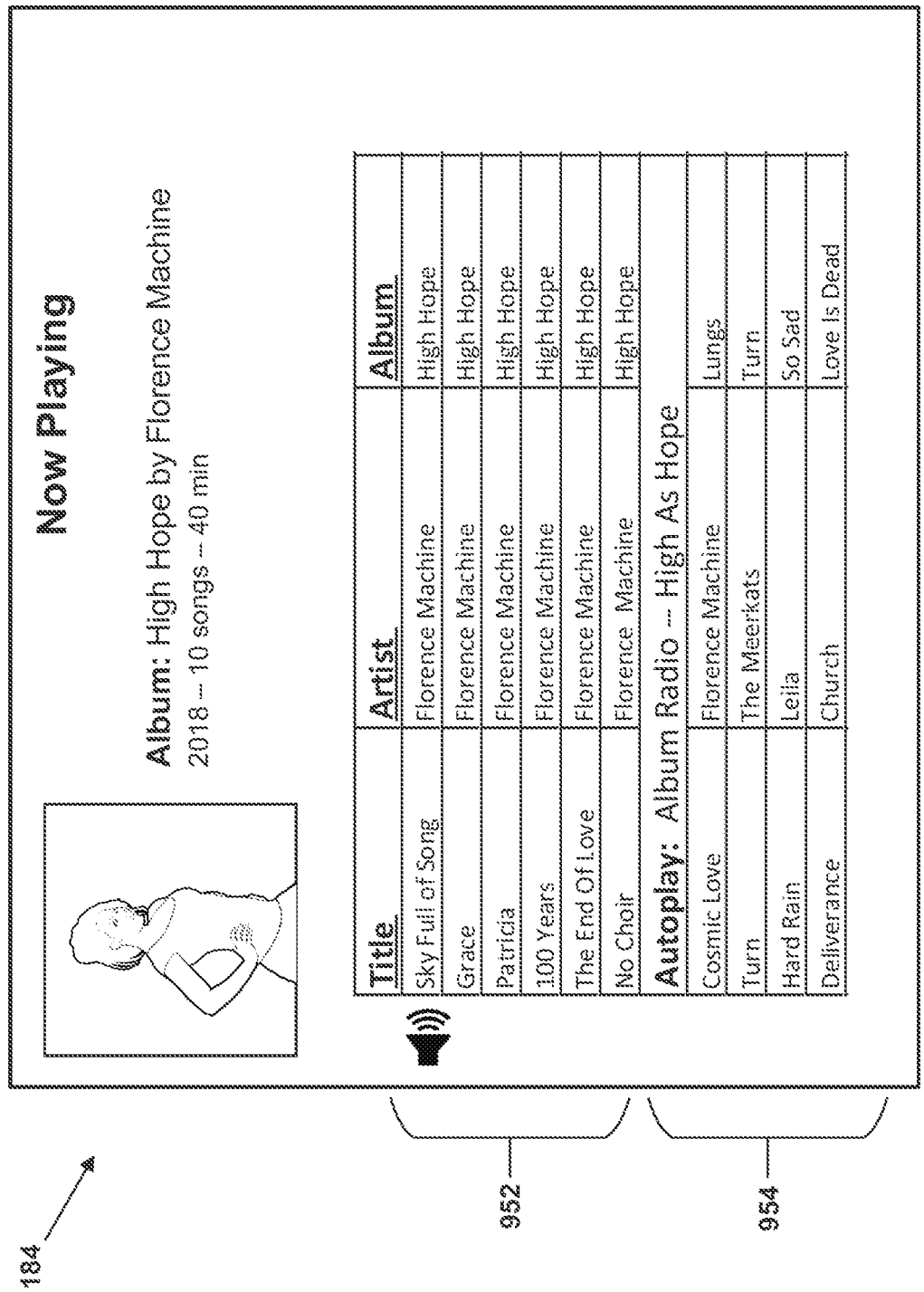
FIG. 10 illustrates an example display of an initial queue of media content items followed by an autoplay queue of media content items.

FIG. 10 illustrates another view of the example display 950 of the initial queue of media content items 952 followed by an autoplay queue 954 of media content items. The autoplay queue generator 118 has identified a radio station based on the album as being appropriate media content for an autoplay queue. The media content items have been added to the "Now Playing" list.

Figure 11:
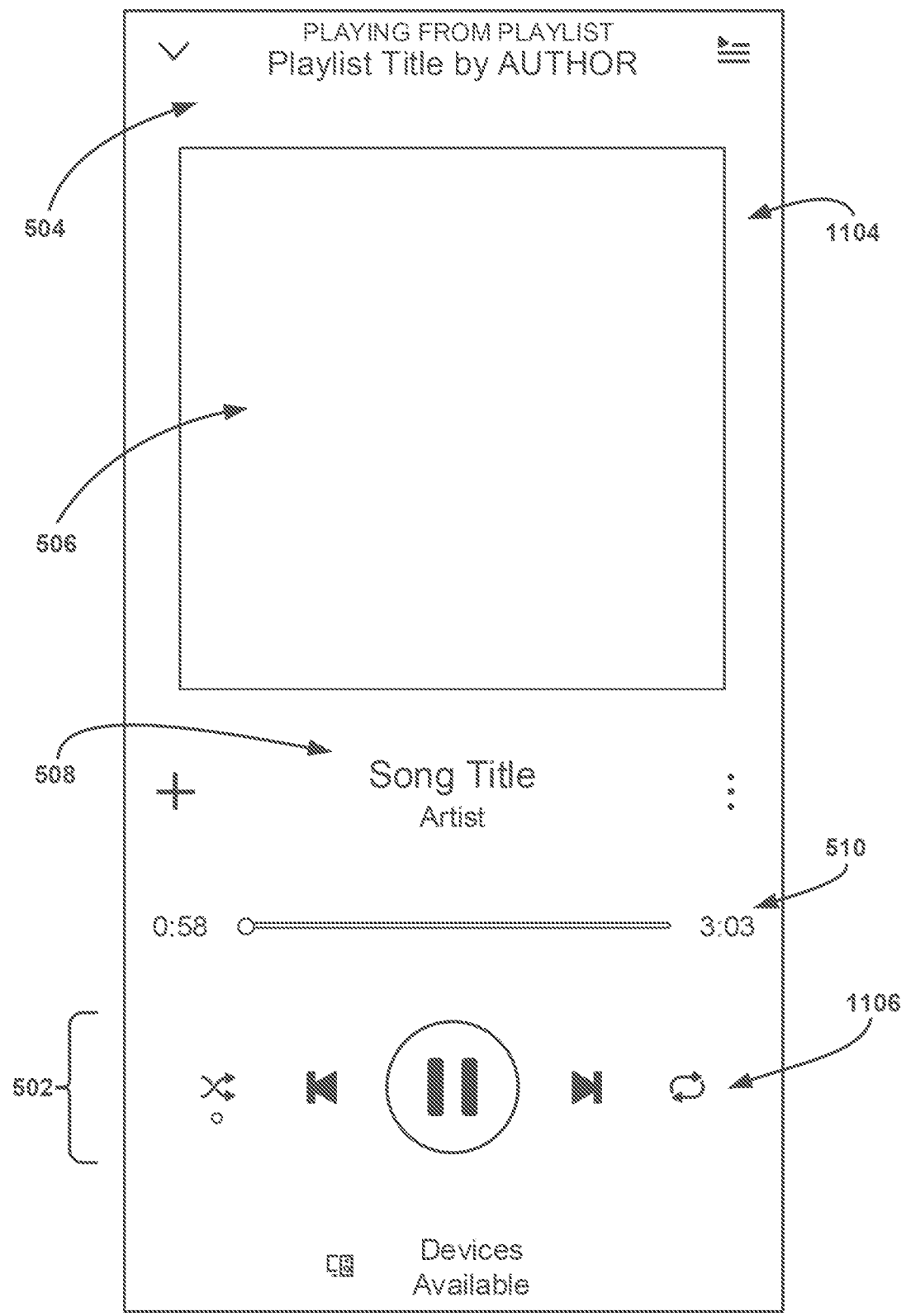
FIG. 11 illustrates an alternative display of a GUI configured to alternate between different playback modes.

FIG. 11 illustrates an alternative display of a GUI 1104A configured to alternate between different playback modes. In some embodiments, the GUI 1104A combines features for different automatic playback options. The autoplay option has been described in detail above. Another automatic playback option is to repeat the media content that is currently playing. Different amounts of media content can be selected to repeat. For example, the current media content item could be repeated. The currently playing media content item could be a song. In another example, the entire queue of media content items could repeat. Once an entire album or other playlist of media content items has played through, the queue will begin to play again.

Options for repeating playback of media content can be combined with options for automatic playback of a different autoplay queue of media content items. In the GUI 1104A shown in FIGS. 11-14, the autoplay switch 106 provides options to toggle between repeating a single track, repeating an entire playlist, automatically playing an autoplay queue, or not automatically playing media content after the initial queue of media content has ended playing. In embodiments, the automatic playback switch is a selectable icon that displays a lemniscate shape when automatic playback is enabled and displays clockwise rightwards and leftwards open circle arrows when repeat is enabled.

FIG. 11 shows the GUI 1104A when the autoplay switch 106 is disabled. The repeat symbol is displayed by default and is shown in a de-emphasized view. This indicates that no additional media content will play after the currently playing initial queue of media content items concludes playback.

Figure 12:
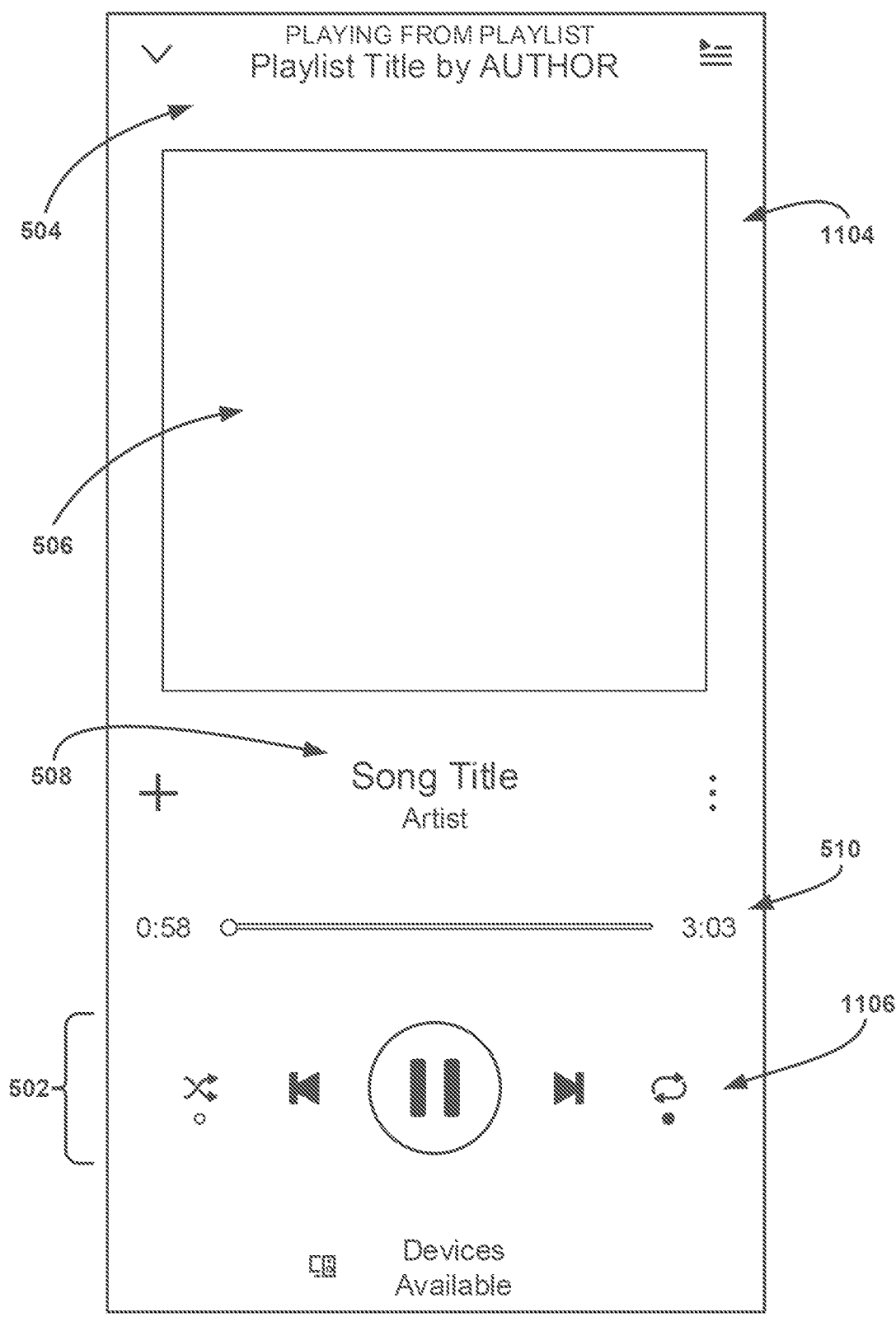
FIG. 12 shows the GUI of FIG. 11 when the autoplay switch is enabled and the option for repeating the currently playing queue of media content items is selected.

FIG. 12 shows the GUI 1104A when the autoplay switch 106 is enabled and the option for repeating the currently playing queue of media content items is selected. This display could be shown after a user selects the autoplay switch 106 of FIG. 11. The repeat symbol is now emphasized in its appearance. Additionally, a visual indicator is added to the display to further emphasize that the repeat option is selected. Here, the visual indicator is a small dot or circle located below the repeat symbol.

Figure 13:
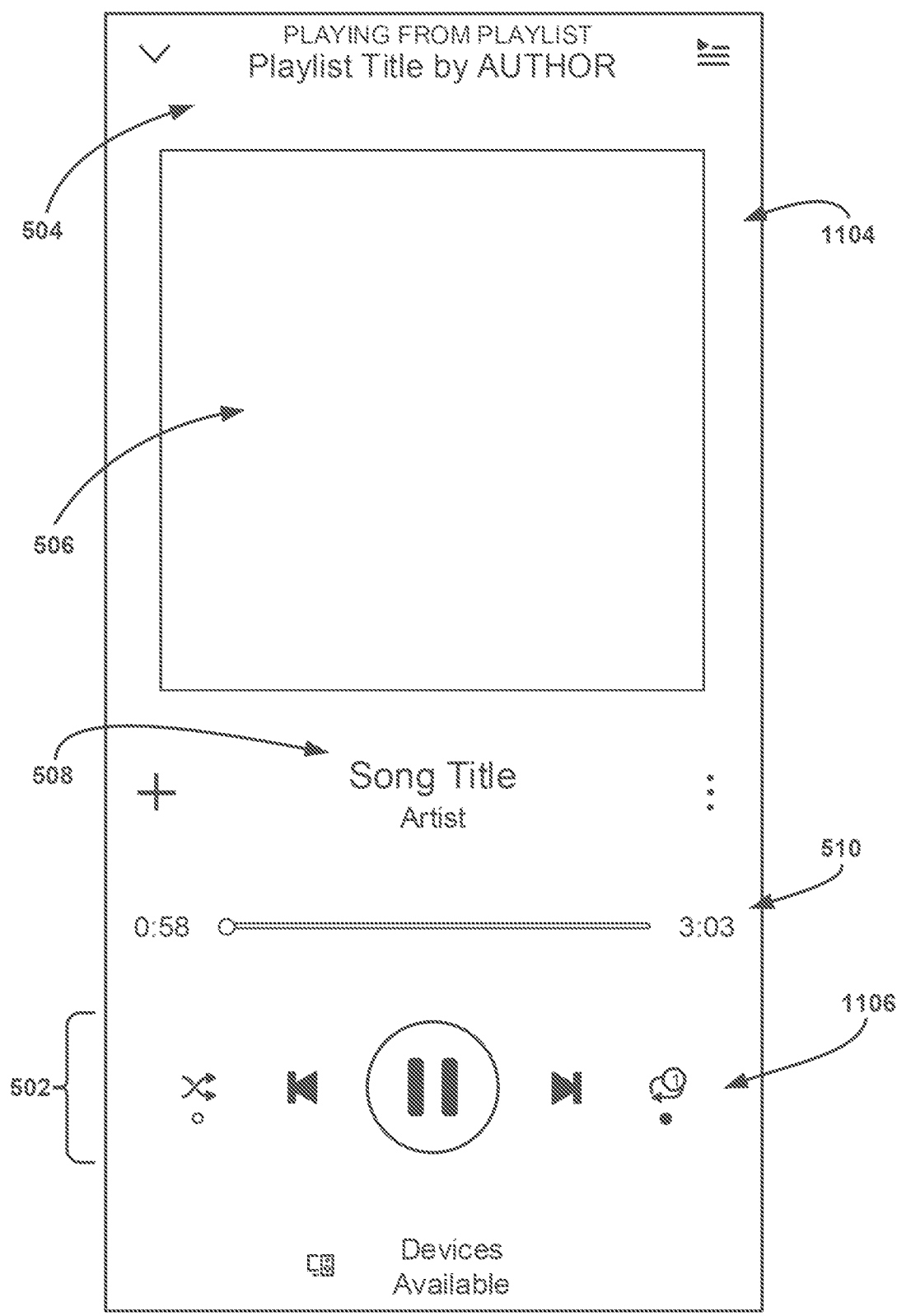
FIG. 13 shows the GUI of FIG. 11 when the autoplay switch is enabled and the option for repeating the currently playing track is selected.

FIG. 13 shows the GUI 1104A after the autoplay switch 106 has been selected again. By touching the image of the repeat symbol in FIG. 12, the display switches to shows the repeat symbol with a numeral 1 to indicate that a single media content item or track will be repeated. Generally, the track will continue to play over and over again until the media playback is stopped, a different queue of media content is selected, or the autoplay switch 106 is engaged to change the automatic playback settings. Here the autoplay switch 106 is shown as a repeat symbol (clockwise rightwards and leftwards open circle arrows) with a dot and a numeral 1. Other options are possible to indicate that a single track will be repeated.

Figure 14:
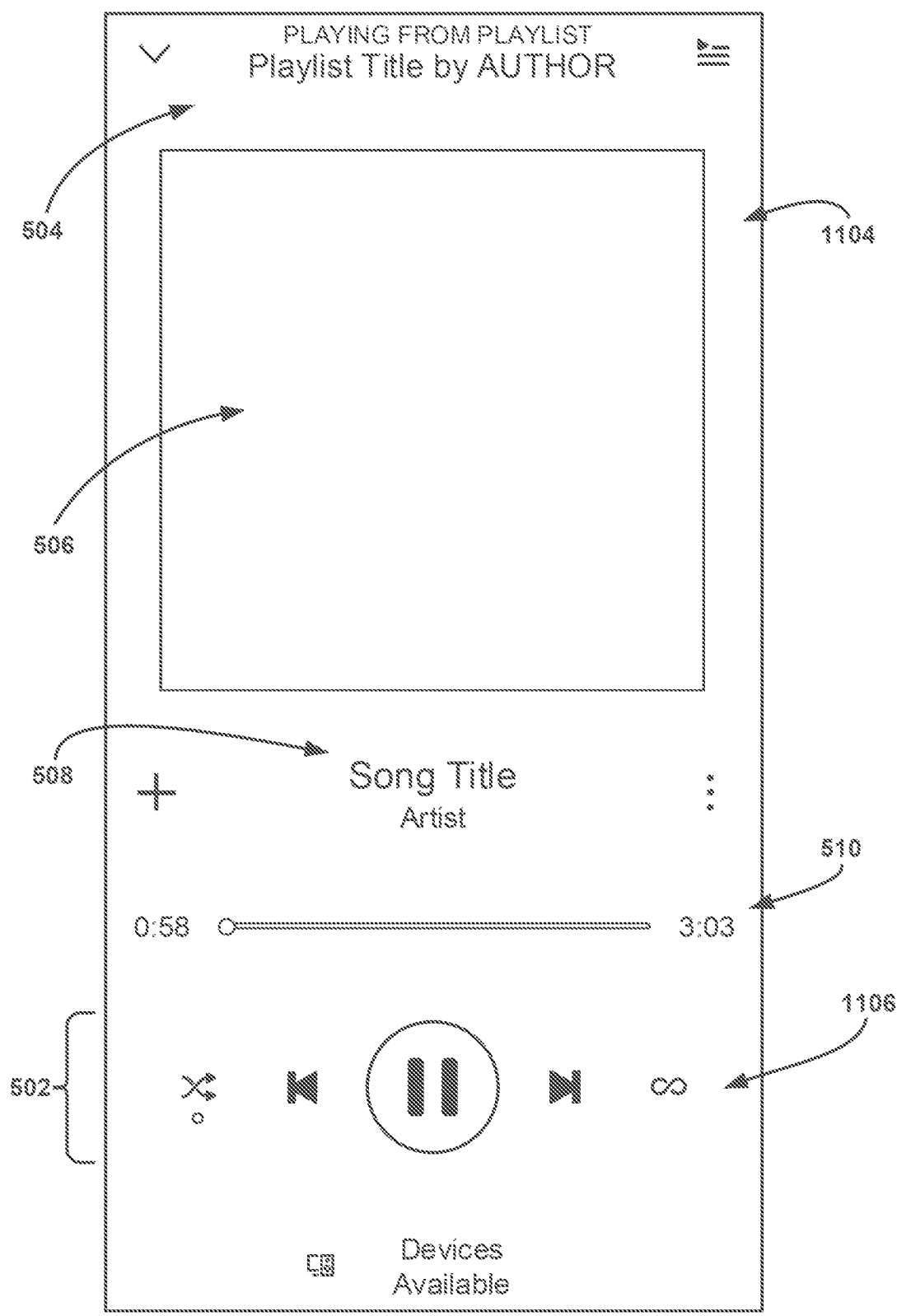
FIG. 14 shows the GUI of FIG. 11 when the autoplay switch is enabled and the option for playing an automatically generated queue of media content is selected.

FIG. 14 shows the GUI 1104A after the autoplay switch 106 shown in FIG. 13 is selected again. The autoplay switch 106 is then displayed to show the lemniscate symbol. This indicates that the automatic playback settings have been changed to select automatic playback of a different automatically generated queue of media content items that are related to the currently playing queue of media content.

In some embodiments, the autoplay switch 106 changes in appearance on the GUI in response to input other than touch input received through the GUI. For example, a physical button could be pressed to indicate that the playback mode should be switched. In another aspect, the playback mode could be changed using a voice command.

The autoplay switch 106 could also be used to select other types of playback such as shuffling a currently playing queue of media content items. A single autoplay switch 106 could be used to rotate between autoplay, repeat, and shuffle options.

The methods and systems above provide the technical advantage of providing automatically generated media content for playback on a media playback device such that a user does not have to put much or any thought into selecting media content to play after an initially selected queue concludes playback. Users can continue to listen to media content that is similar, but still different from what was already playing. This is beneficial because users often do not want to interrupt what they are doing to browse through media content in order to keep media content playing. Overall, this disclosure provides the advantage of fewer user interactions to achieve a media consumption experience that is enjoyable for the user. This improves the efficiency of a media playback device operating to utilize a media streaming service.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A computer-implemented method of controlling playback of media content items on a media playback device, the method comprising:
    displaying on the media playback device a graphical user interface comprising a plurality of graphical control elements that control playback of the media content items on the media playback device, the plurality of graphical control elements comprising an automatic playback switch positioned next to one or more additional graphical control elements of the plurality graphical control elements, the automatic playback switch configured to switch between a plurality of playback modes when selected, the plurality of playback modes including: automatic playback off mode and autoplay mode, wherein the plurality of graphical control elements are displayed within a same view of the graphical user interface;
    retrieving and playing an initial queue of media content items on the media playback device;
    determining a current state of the automatic playback switch;
    when the current state is the autoplay mode:
    displaying a first symbol that indicates the current state is the autoplay mode on the graphical user interface;
    determining an autoplay queue of media content items on the media playback device, the autoplay queue of media content items being automatically selected to include media content items related to at least two of the media content items in the initial queue of media content items; and
    upon concluding playback of the initial queue of media content items, automatically initiating playback of the autoplay queue of media content items; and
    when the current state is the automatic playback off mode:
    displaying a second symbol that indicates the current state is the automatic playback off mode on the graphical user interface; and
    upon concluding playback of the initial queue of media content items, stopping playback.

2. The computer-implemented method of claim 1, wherein the first symbol is an emphasized symbol.

3. The computer-implemented method of claim 2, wherein the second symbol is a de-emphasized symbol.

4. The computer-implemented method of claim 2, wherein the emphasized symbol includes a visual indicator.

5. The computer-implemented method of claim 4, wherein the visual indicator is a dot.

6. The computer-implemented method of claim 4, wherein the second symbol is a de-emphasized symbol that does not include the visual indicator.

7. The computer-implemented method of claim 1, further comprising:
    receiving one or more selections of the automatic playback switch by a user; and
    based on the one or more selections of the automatic playback switch by the user, displaying the first symbol or the second symbol.

8. The method of claim 1, further comprising, when the current state is the autoplay mode:
    determining a media context category of the media content items in the initial queue of media content items; and
    determining a type of the autoplay queue of media content items to select based on the media context category, wherein determining the autoplay queue of media content items is based on the type of the autoplay queue of media content items.

9. A system for controlling playback of media content items on a media playback device, the system comprising:
    a media playback device comprising:
    a user input device configured to receive selections of media playback options;
    a media content output device configured to play streamed media content; and
    a media playback application configured to:
    generate a graphical user interface comprising a plurality of graphical control elements that control playback of the media content items on the media playback device, the plurality of graphical control elements comprising an automatic playback switch positioned next to one or more additional graphical control elements of the plurality of graphical control elements, wherein the plurality of graphical control elements are displayed within a same view of the graphical user interface;
    determine a current state of the automatic playback switch;
    display a symbol that corresponds to the current state of the automatic playback switch on the graphical user interface; and
    when the current state is an autoplay mode:
    determine an autoplay queue of media content items on the media playback device, the autoplay queue of media content items being automatically selected to include media content items related to at least two of the media content items in an initial queue of media content items, and upon concluding playback of the initial queue of media content items, automatically initiate playback of the autoplay queue of media content items.

10. The system of claim 9, wherein the media playback application is further configured to display the symbol or a new symbol corresponding to the current state selected by a user on the graphical user interface based on a selection of the automatic playback switch received by the user input device.

11. The system of claim 9, wherein the symbol is a lemniscate.

12. The system of claim 9, wherein the user input device receives voice input to select the current state of the automatic playback switch.

13. The system of claim 9, wherein the automatic playback switch is configured to switch between at least three playback modes when selected.

14. A computer-implemented method of controlling playback of media content items on a media playback device, the method comprising:

displaying on the media playback device a graphical user interface comprising a plurality of graphical control elements that control playback of the media content items on the media playback device, the plurality of graphical control elements comprising an automatic playback switch positioned next to one or more additional graphical control elements of the plurality of graphical control elements, the automatic playback switch configured to switch between a plurality of playback modes when selected, wherein the plurality of graphical control elements are displayed within a same view of the graphical user interface;

determining a current state of the automatic playback switch;

displaying a symbol corresponding to the current state of the automatic playback switch on the graphical user interface; and when the current state is an autoplay mode:

determining an autoplay queue of media content items on the media playback device, the autoplay queue of media content items being automatically selected to include the media content items related to at least two of the media content items in an initial queue of media content items, and upon concluding playback of the initial queue of media content items, automatically initiating playback of the autoplay queue of media content items.

15. The computer-implemented method of claim 14, further comprising:

receiving one or more selections of the automatic playback switch by a user; and based on the one or more selections of the automatic playback switch by the user, displaying the symbol or a new symbol corresponding to the current state selected by the user on the graphical user interface.

16. The computer-implemented method of claim 14, wherein, when the current state is the autoplay mode, the symbol is emphasized.

17. The computer-implemented method of claim 14, wherein the graphical user interface is a first graphical user interface, and further comprising displaying on the media playback device a second graphical user interface comprising a list of media playback content items.

18. The computer-implemented method of claim 17, wherein the list of media playback content items includes the media content items of the initial queue of media content items when the current state is an automatic playback off mode.

19. The computer-implemented method of claim 17, wherein the list of media playback content items includes the media content items of the initial queue of media content items and the autoplay queue of media content items when the current state is the autoplay mode.

20. The computer-implemented method of claim 14, wherein the automatic playback switch is configured to switch between at least three playback modes when selected.

* * * * *